T. D. LAYMAN.
DETACHABLE GUN MAGAZINE.
APPLICATION FILED MAY 31, 1912.
1,069,339.
Patented Aug. 5, 1913.
3 SHEETS—SHEET 1.
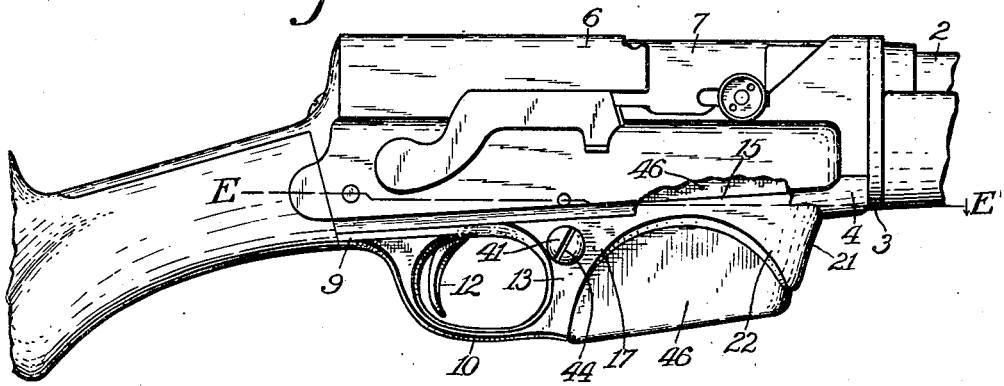
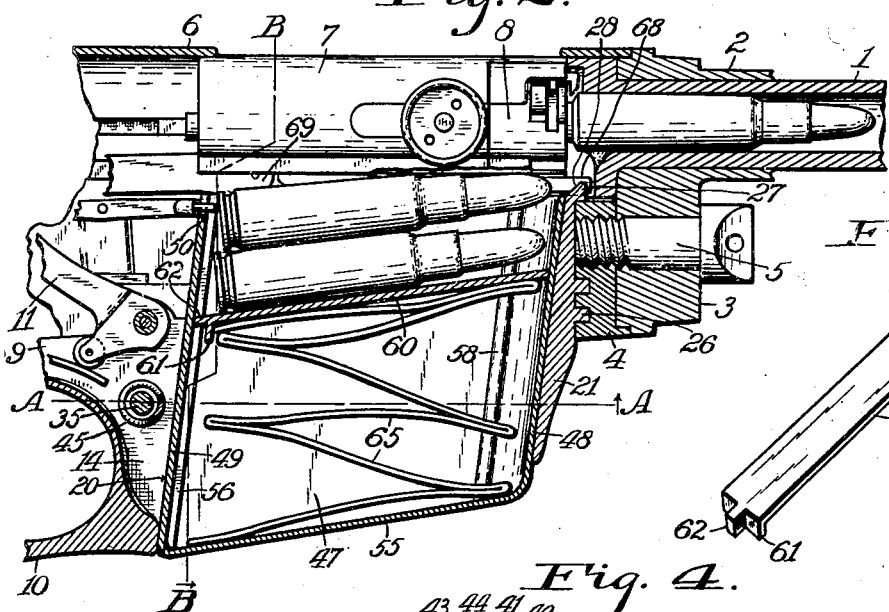
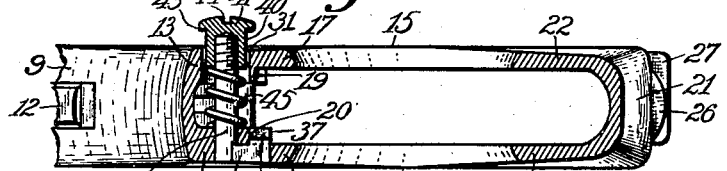
WITNESSES:
J. H. Gardner.
M. J. Messenheimer.
INVENTOR:
Theodore D. Layman,
BY
E. T. Silvius,
ATTORNEY.

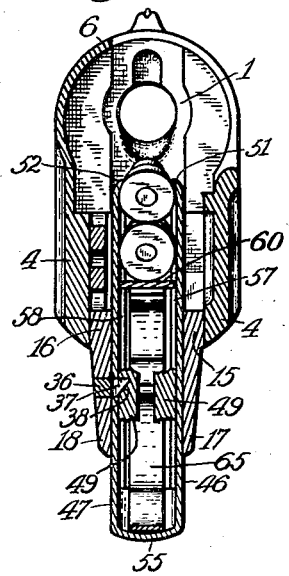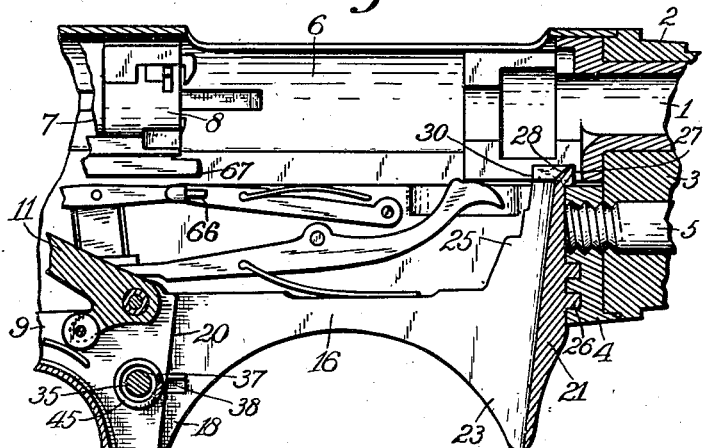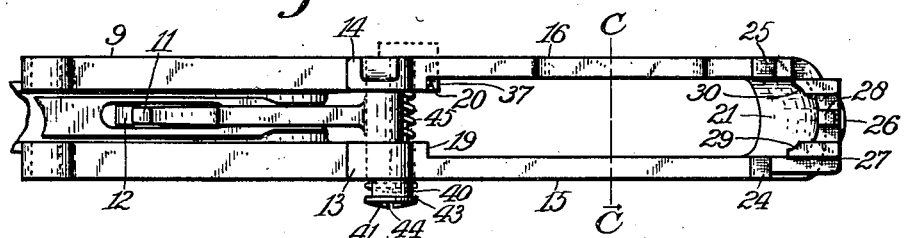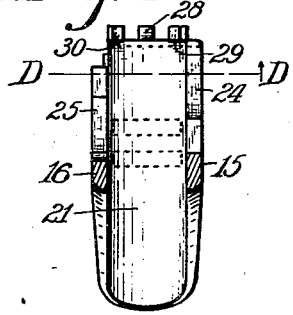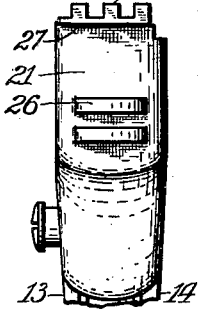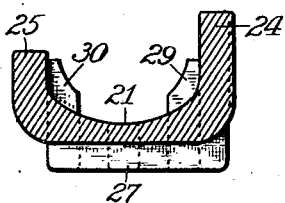

T. D. LAYMAN.
DETACHABLE GUN MAGAZINE.
APPLICATION FILED MAY 31, 1912.
1,069,339.
Patented Aug. 5, 1913.
3 SHEETS—SHEET 3.
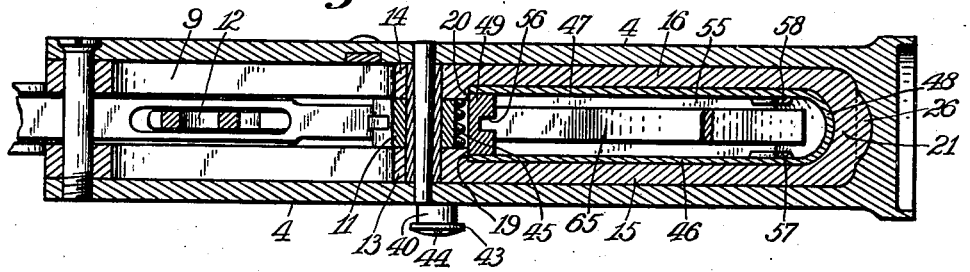
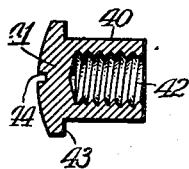
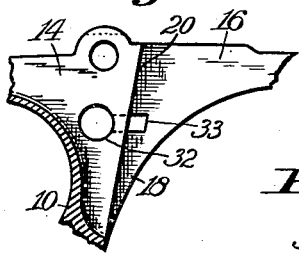
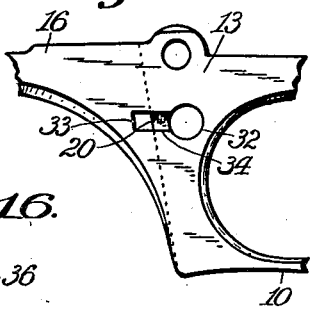
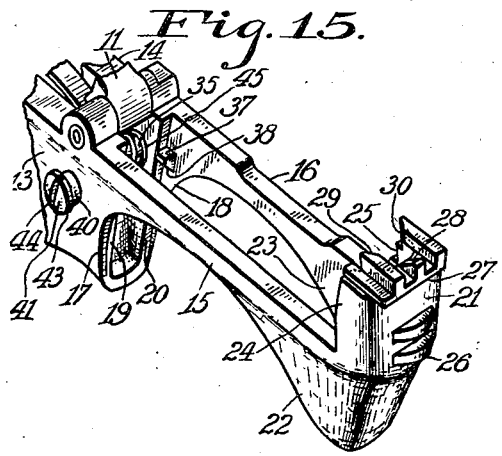
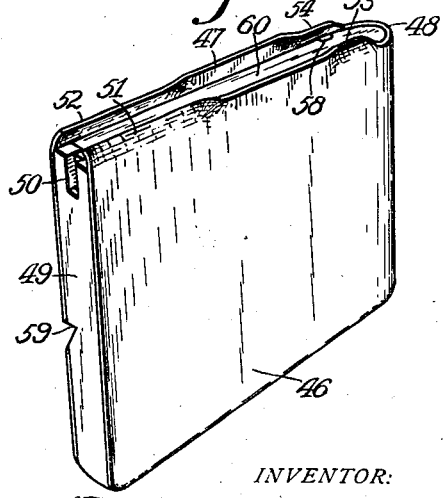
WITNESSES:
J. H. Gardner
M. G. Messenheimer
INVENTOR:
Theodore D. Layman,
BY
E. Silvius.
ATTORNEY.

UNITED STATES PATENT OFFICE.

THEODORE D. LAYMAN, OF INDIANAPOLIS, INDIANA.

DETACHABLE GUN-MAGAZINE.

1,069,339.

Specification of Letters Patent.

Patented Aug. 5, 1913.

Application filed May 31, 1912. Serial No. 700,707.

*To all whom it may concern:*

Be it known that I, THEODORE D. LAYMAN, a citizen of the United States, residing at Indianapolis, in the county of Marion and State of Indiana, have invented a new and useful Detachable Gun-Magazine, of which the following is a specification, reference being had to the accompanying drawings and to the letters and figures of reference marked thereon.

This invention relates to cartridge magazines and means for detachably connecting the magazines to guns, more especially to auto-loading rifles in which high power cartridges of the bottle neck type are used, the invention having reference more particularly to a magazine and a trigger plate that are designed to be readily applied to existing rifles after removing unsatisfactory corresponding parts of the rifles, the improved parts being applicable also to new rifles or guns of various types.

An object of the invention is to provide an improved magazine and means for detachably connecting the magazine to a gun in a reliable manner to prevent accidental unlocking of the magazine when the gun is fired.

A further object of the invention is to provide detachable magazine attachments that shall be so constructed that a hunter wearing thick gloves may easily unlock and remove a magazine and replace it by another loaded magazine without necessitating the removal of his gloves.

A further object of the invention is to provide a detachable magazine that shall be free from projections that would be liable to catch in the garments of the hunter when handling the magazines or placing them into his pockets or into the gun.

A still further object is to provide an improved trigger plate that shall be so constructed as to not only detachably connect the magazine with the gun, but shall serve to guard the magazine against accidental injury during rough usage while hunting or under other circumstances, which magazine and connecting means shall be relatively simple in construction, afford positive locking means and be durable and economical in use.

The invention consists in an improved trigger plate for guns, provided with a transversely operating locking bolt and also provided with a magazine guard, and a magazine removably secured in the trigger plate by means of the locking bolt.

The invention consists also in the various novel parts and combinations and arrangements of parts as hereinafter particularly described and claimed.

Referring to the drawings, Figure 1 is a fragmentary side elevation of an auto-loading rifle of well known type provided with the improved magazine and attachments therefor; Fig. 2, a longitudinal sectional elevation of Fig. 1 on an enlarged scale; Fig. 3, a perspective view of the follower for the magazine; Fig. 4, a fragmentary section approximately on the plane of the line A A in Fig. 2; Fig. 5, a transverse section approximately on the line B B in Fig. 2; Fig. 6, a central section similar to Fig. 2 omitting the magazine; Fig. 7, a top plan of the improved trigger plate; Fig. 8, a section of the trigger plate on the line C C in Fig. 7; Fig. 9 a front elevation of the trigger plate; Fig. 10, a section of the trigger plate on the line D D in Fig. 8; Fig. 11, a section approximately on the line E E in Fig. 1; Fig. 12, a central section of a part of the locking bolt; Fig. 13, a fragmentary section of the trigger plate; Fig. 14, a fragmentary side elevation of the trigger plate; Fig. 15, a perspective view of the improved portions of the trigger plate provided with the improved magazine lock; Fig. 16, a perspective view of the main part of the improved lock bolt, and Fig. 17, a perspective view of the improved magazine.

In the drawings similar reference characters throughout the several figures thereof indicate corresponding elements or features of construction herein referred to.

In order that a clear understanding of the structure and function of the invention may be had, the same is conveniently shown as applied to a popular type of rifle used largely for hunting purposes, familiar parts of the rifle comprising a barrel 1 movable in a jacket or fore-stock 2 having a lug 3 that is detachably secured to a lock frame 4 by a bolt 5. The lock frame has a receiver 6 in which a bolt carrier 7 is movably mounted and has a breech bolt 8 movably mounted therein. The rifle referred to has originally a trigger plate that is removably secured in the under portion of the lock frame and connected with the under side of the butt-stock, said trigger plate being omitted in the drawings and replaced by the improved trigger plate and other elements of the invention.

As preferably constructed the invention comprises a trigger plate 9 which in contour is similar to and is applied in place of the trigger plate heretofore used, and it has a trigger guard 10 and supports a hammer 11 and a trigger 12. The trigger plate has an opening therein so that structurally two side plates 13 and 14 are formed forwardly of the trigger guard, the hammer being arranged between the plates. Two side bars 15 and 16 extend forwardly from the outer portions of the plates and they are somewhat thinner than the plates and have extensions 17 and 18 respectively, that are continuous with the plates 13 and 14. Forwardly facing shoulders constituting straight guides 19 and 20 are formed on the ends of the plates at a short distance forward of the trigger guard, the guides extending obliquely to the plane of the top of the trigger plate which is seated in a suitable recess in the lock frame 4. The side bars 15 and 16 have an integral end bar 21 thereon and the inner side thereof constitutes a guide that is opposite and parallel to the plane of the guides 19 and 20, and it extends upwardly and also downwardly when in normal position relative to the side bars, the latter having extensions 22 and 23 respectively that are integral with the end bar and with it constitute a guard for the forward portion of the magazine. The lower edges of the side bars and their extensions are curved as arches so as to leave the middle portions of the magazine accessible, the side bars 15 and 16 having also extensions 24 and 25 that are integral with the upwardly extending portion of the end bar 21. The exterior of the end bar 21, being the forward end of the trigger plate, is provided with tongues 26 that extend into suitable recesses in the frame 4, the trigger plate being suitably fitted into an opening in the frame. The upper end or top of the end bar 21 has a projecting lug 27 thereon that extends onto a suitable shoulder formed in the frame 4. The upper end or top of the bar 21 is adjacent the rear end of the barrel 1 and has an inclined guide 28 thereon for guiding the nose of the cartridges upwardly into the barrel, and at opposite sides of the guide the upper end of the bar 21 has two inwardly extending stop projections 29 and 30 thereon for limiting the inward or upward movement of the magazine.

The side plate 13 has a cylindrical guide bore 31 therein and the plate 14 has a relatively smaller guide bore 32 therein in alinement with the bore 31, the guide bores being relatively close to the guides 19 and 20 respectively, and the extension 18 of the side bar 16 has a guideway 33 therein adjacent to the guide 20, a recess 34 being formed in the outer side of the plate 14 and extending from the guide bore 32 to the guideway 33.

A novel locking bolt is provided which comprises a main bar 35 that is fitted movably in the guide bore 32 and has a lateral arm 36 on one end thereof that normally extends in the recess 34 and has for a catch or slide bar 37 thereon that extends through the guideway 33, the catch having a downwardly facing inclined side 38 whereby to retract the catch. The opposite end of the bar 35 has screw-threads 39 thereon and it extends into the bore 31. The locking bolt comprises also a cylinder 40 having a head 41 and is fitted slidingly into the bore 31 and has internal screw-threads 42 which engage the screw-threads 39, the cylinder head having a flange 43 to be moved into contact with the plate 13 for limiting the movement of the locking bolt when retracting the catch. The head 41 preferably has a slot 44 therein to receive a screwdriver. A spring 45 is coiled about the bar 35 and is seated against the inner end of the cylinder within the bore 31 and is seated also against the inner side of the plate 14, and the spring has sufficient tension to normally hold the catch 37 in normal position projected through the guideway 33.

A box-magazine comprises two side plates 46 and 47, a rounded forward end 48, and a relatively thick rear end 49 in the upper end of which is a slot 50, the side plates extending upward slightly beyond the plane of the top of the ends of the magazine and having curved lip portions 51 and 52 respectively extending over each toward the other adjacent to the rear end and also similarly curved portions 53 and 54 adjacent to the forward end, the latter serving as stops for the follower, the magazine having also a bottom 55. The inner side of the rear end 49 has a longitudinal guide groove 56 therein. The forward portions of the side plates 46 and 47 are provided on their inner sides with vertical guide ribs 57 and 58 respectively that are parallel to the rear end 49. The rear end portion of the magazine is suitably provided with a shoulder 59 facing downwardly and is preferably formed by recessing one side of the rear end 49 so that when the magazine is in normal position the shoulder is engaged by the catch 37 and securely locked, with the top of the end 48 against the stops 29 and 30. A suitable follower 60 is placed in the magazine and has a guide lip 61 on its rear end that slides against the end 49 and has also a tongue 62 that is guided in the groove 56. The opposite end portion of the follower has notches 63 and 64 in opposite edges thereof that receive the guide ribs 57 and 58 respectively. A suitable spring 65 is supported on the bottom 55 and yieldingly supports the follower 60 for forcing the cartridges out of the magazine to be carried into the gun barrel. The slot 50 receives a finger 66 that comprises a part of the gun structure, and the top of the rear end 49 is stopped against the push bars 67 and 68 or the operating rods 69 with which the carrier 7 is provided. The magazine is closely fitted between the side bars 15 and 16 and also between the end guides so as to be firm when inserted in the trigger plate, the extremely long guiding surfaces in the latter being ample to afford smooth movement of the magazine when being inserted or withdrawn.

In practical use the gun barrel may contain one cartridge and as designed the magazine may contain five cartridges, the uppermost one of those in the magazine being in contact with the lips 51 and 52 until moved therefrom by the push bars 67 and 68 into the barrel to replace an ejected shell. The operations incidental to firing the gun are well known and require no further description. When the magazine becomes empty or when it is desired to detach it from the gun it is only necessary to press the head 41 slightly and thereby retract the catch 37 from the shoulder 59, and then withdraw the magazine and release the head.

In order to apply the magazine to the gun the rounded forward end 48 is slightly inserted in the guideway formed by the end 21 and the extensions 22 and 23 of the trigger plate, and then the rear end portion of the magazine between the guiding extensions 17 and 18, the curved lips 51 and 52 facilitating the latter movement, the rear end being further pushed inwardly and tilting the magazine slightly to bring the rear end 49 parallel with the guides 19 and 20, after which slightly more force is applied and the magazine pushed in until stopped, the lip 52 in its passage causing the catch 37 to be retracted until the magazine is seated in normal position, when the catch enters the recess and engages the shoulder 59. It will be understood that in case the spring 45 becomes weak or fractured during a hunting expedition the locking bolt cannot be retracted by the concussion incidental to firing the gun.

Having thus described the invention, what is claimed as new is:—

1. A magazine gun including a barrel, a lock frame, and a trigger plate secured to the frame and comprising a trigger guard, two side plates extending forward from the guard and constituting two continuous magazine guides respectively, two side bars extending forward from the outer sides of the side plates and having a forward magazine guard and guide thereon that extends opposite the two guides and upward into the lock frame and downward beyond the plane of the side bars, the guard extending also downward from the outer sides of the side bars.

2. A gun including a barrel, a lock frame, a trigger plate secured to the frame and comprising two side plates and two side bars extending from the outer sides of the ends of the side plates respectively, the ends of the two side plates constituting two continuous guides respectively, an end bar formed on the ends of the side bars and extending into the frame and also downward opposite the two guides, and a magazine detachably secured in contact with the two guides and the end bar, the upper portion of the magazine being between the side bars and the forward portion embraced and substantially covered by the end bar.

3. A gun including a barrel, a lock frame, a trigger plate detachably secured to the frame and comprising two side bars and an end bar on the ends of the side bars, the end bar extending into the frame adjacent to the end of the barrel and having an inclined guide thereon extending upwardly toward the barrel, a trigger guard on the plate, a locking device movably mounted in the plate adjacent to the trigger guard, and a magazine removably inserted between the two side bars and guided against the end bar, the magazine having a shoulder supported on the locking device.

4. A gun including a barrel, a lock frame, a trigger plate secured to the frame and comprising two forwardly extending side bars and an end bar on the ends of the side bars, the end bar extending into the frame adjacent to the end of the barrel and having a rearwardly extending stop projection on its upper end, a trigger guard on the trigger plate, a locking device movably mounted in the trigger plate, and a magazine removably inserted between the two side bars and adjacent the end bar against the stop projection, the magazine having a shoulder supported on the locking device.

5. A gun including a trigger plate comprising two side plates spaced apart and two side bars having extensions extending from the outer sides of the ends of the plates respectively, a lock bolt movably mounted in the two side plates adjacent to their ends and having an arm thereon provided with a catch normally projected through one of the extensions opposite the end of the adjacent one of the side plates, an operating head removably secured to the lock bolt and stopped by the adjacent side plate, a spring between the two side plates coöperating with the operating head and one of the plates to hold the catch in normal position, and a magazine removably inserted between the two side bars and their extensions in contact with the ends of the side plates and having a shoulder normally supported on the catch.

6. A gun including a trigger plate comprising two side plates and two side bars on the plates respectively, the side plates having each a guide bore therein, one of the side bars having a guideway therein forward of and adjacent to one of the bores, a locking bolt movable in the guide bores and having an arm on one end thereof extending laterally to the guideway, the arm having a catch thereon normally extending through the guideway, the locking bolt having an operating head on the opposite end thereof extending opposite the outer side of the adjacent side plate, a spring supported between the side plates and engaging the lock bolt for yieldingly holding the catch in normal position, and a magazine removably inserted between the side bars and having a shoulder normally supported on the catch.

7. A gun including a barrel, a lock frame, a trigger plate secured to the lock frame and comprising two side plates and two side bars extending from the ends of the plates and having an end bar on the ends thereof that extends downward beyond the plane of the side bars, the end bar extending into the frame adjacent to the end of the barrel, the side bars having relatively short extensions on the under side thereof that are integral with the end bar and therewith constituting a forward magazine guard, and a magazine removably inserted and secured behind the end bar and between the side bars and extensions thereof, the major portion of the magazine being exposed below the side bars and rearward of the end bar and the extensions.

8. A gun including a lock frame, a barrel connected with the lock frame, a trigger plate secured to the frame and comprising two side plates and two side bars extending from the outer sides of the ends of the side plates and having an end bar on the ends thereof that extends upward beyond the plane of the tops of the side bars approximately to the end of the barrel, the end bar having an inclined guide thereon extending upwardly toward the barrel, the ends of the side plates between the side bars constituting respectively two continuous guides opposite the end bar, a magazine removably inserted between the side bars in contact with the end bar and the two guides, and means for detachably securing the magazine in position.

9. A gun including a barrel, a lock frame, a trigger plate detachably secured to the frame and comprising two side bars and an end bar on the ends of the side bars, the end bar extending into the frame adjacent to the end of the barrel and having an inclined guide thereon extending upwardly toward the barrel, the end bar having also a stop projection thereon, a trigger guard on the plate, a locking device movably mounted in the plate adjacent to the trigger guard, a magazine removably inserted between the two side bars and adjacent the end bar against the stop projection, the magazine having a shoulder supported on the locking device, and a spring-pressed follower in the magazine.

10. In a gun, the combination with a lock frame, of a trigger plate secured to said frame and comprising two side plates and side bars extending from the plates, the bars having an end bar thereon, one of said plates having a guide bore therein, the adjacent side bar having a guideway therein in proximity to the guide bore, the remaining side plate having a relatively larger guide bore therein, a lock bar slidingly mounted in the smaller one of said bores and having an arm on one end extending to said guideway, the arm having a projecting catch normally extending through said guideway, a cylinder movably guided in said larger bore and detachably secured to said lock, the cylinder having a head provided with a stop flange extending opposite the outer side of the adjacent plate, a spring on said lock bar seated against said cylinder and also against the opposite one of said plates for yieldingly holding said catch in projected position, and a magazine removably inserted between said side bars and guided by said side plates and said end bar, the magazine having a recess in one side thereof forming a shoulder supported on said catch.

11. In a gun, the combination with a lock frame, of a trigger plate detachably secured to the frame and comprising two side plates and two side bars extending from the plates, an end bar being connected to the ends of the side bars, the side plates having each a guide bore therein, one of the side plates having a recess in the outer side thereof extending from the bore therein, the adjacent side bar having a guideway therein extending from said recess, a locking bolt movable in said bores and having an arm thereon extending in said recess, said arm having a catch thereon normally extending through said guideway, one end of said bolt extending beyond one of said plates, a spring supported between said plates and engaging the locking bolt for yieldingly holding said catch in normal position, and a magazine removably inserted between said end bar and the ends of said side plates and guided thereby between said side bars, the magazine having a shoulder supported upon said catch.

12. In a gun, the combination with a lock frame, of a trigger plate detachably secured to the frame and comprising two side plates and two side bars extending from the outer sides of the ends of the plates and having an end bar on the ends thereof that extends beyond the upper and the under sides of the plane of the side bars, the ends of said plates between the side bars constituting guides opposite said end bar, said side bars having extensions on one side thereof that are integral with said plates and also other extensions that are integral with said end bar and therewith constituting a forward magazine guard, a magazine removably inserted behind said guard in contact with said guides and between said side bars, and means for detachably securing the magazine in position.

13. In a gun, the combination with a lock frame, and a barrel movably connected with the frame, of a trigger plate secured to the frame and comprising two side bars, and an end bar on the ends of the side bars that extends upward therefrom and into the frame adjacent to the end of the barrel and also downward beyond the plane of the side bars, the top of the end bar having an inclined guide thereon extending upwardly toward the barrel, the end bar having also a stop projection thereon extending rearwardly at one side of the guide, said side bars having extensions thereon respectively that extend upwardly into said frame and are integral with said end bar and said stop projection, a magazine removably inserted between said side bars in contact with said end bar and extensions to said guide and said stop projection, and means for detachably securing the magazine in said position.

In testimony whereof, I affix my signature in presence of two witnesses.

THEODORE D. LAYMAN.

Witnesses:
   E. T. SILVIUS,
   CHARLOTTE WRIGHT.